(12) United States Patent
Abell

(10) Patent No.: US 6,325,581 B1
(45) Date of Patent: Dec. 4, 2001

(54) STEEL SETTING DEVICE

(76) Inventor: Joseph Abell, 10164 Ruth Dr., Wadsworth, OH (US) 44281

(*) Notice: Subject to any disclaimer, the term of this patent is extended or adjusted under 35 U.S.C. 154(b) by 0 days.

(21) Appl. No.: 09/679,647

(22) Filed: Oct. 5, 2000

(51) Int. Cl.$^7$ .............................. F16B 19/00; F16B 35/04
(52) U.S. Cl. ........................... 411/355; 411/315; 411/424
(58) Field of Search ................................... 411/354, 355, 411/411, 424, 315

(56) References Cited

U.S. PATENT DOCUMENTS

| | | |
|---|---|---|
| 1,546,082 | 7/1925 | Kempf . |
| 1,761,581 | * 6/1930 | Northey et al. ................ 411/355 X |
| 1,776,007 | * 9/1930 | Peters ................................... 411/355 |
| 1,843,925 | 2/1932 | Kempf . |
| 2,589,781 | 3/1952 | Cottrell . |
| 2,941,437 | 6/1960 | Brander . |
| 3,203,548 | 8/1965 | Roubal . |
| 4,240,322 | 12/1980 | Teske . |
| 4,508,479 | 4/1985 | Mez . |
| 4,846,615 | 7/1989 | Forsyth . |
| 4,975,009 | 12/1990 | Easton et al. . |
| 5,904,875 | 5/1999 | Myers . |

FOREIGN PATENT DOCUMENTS

| | | |
|---|---|---|
| 356714 | 7/1922 | (DE) . |
| 1070690 | 2/1954 | (FR) . |

* cited by examiner

Primary Examiner—Neill Wilson
(74) Attorney, Agent, or Firm—Richard C. Litman

(57) ABSTRACT

The steel setting device is a pair of temporary bolts, wherein each bolt having an enlarged flat head portion, a cylindrical body portion with a slot extending through the body portion proximate the head, and a tapered portion. The device includes a flat wedge element having an isosceles trapezoidal shape. The bolts are inserted through aligned apertures in the steel plates of girders to be joined to a column, the plates being placed to abut the column, the head portion of the bolt being on one side of the plate and the slot being on the other side of the column. The wedge elements are inserted through the slots to temporarily secure the two steel plates together. Permanent bolts and nuts may then be installed through other pairs of aligned apertures in the plates. Once the permanent bolts are installed, the wedges may be tapped out of the slots and the cylindrical bolt elements of the steel setting device may be removed. Additional permanent bolts may be installed through the aligned apertures previously occupied by the temporary bolts of the steel setting device.

10 Claims, 8 Drawing Sheets

STEEL SETTING DEVICE

BACKGROUND OF THE INVENTION

1. Field of the Invention

The present invention relates generally to bolting steel plates. More specifically, the invention is a device for setting or aligning steel girders horizontally on a vertical girder using two temporary bolts.

2. Description of the Related Art

The present invention is directed to a device for setting or aligning steel plates using temporary bolts secured by wedges inserted through the shafts of the bolts. There is a need for a simple and economical method of aligning apertured steel plates or girders accurately to another steel plate or a column. The related art will be discussed in the order of perceived relevance to the present invention.

German Patent Application No. 356,714 published on Jul. 27, 1922, for Johann Feldmann describes a cylindrical bolt with a round head, a flattened end and a transverse slot shaped with an inclined side for accepting a triangular wedge. The bolt and wedge are distinguishable for the required configuration of the slot to accept the triangular wedge.

French Patent Application No. 1,070,690 published on Feb. 24, 1954, describes a bolt and wedge assembly. The bolt has a rounded head, a slot and a tapered nose. The slot is configured with one flat edge proximate the head and an opposite inclined edge. The wedge has a series of holes for insertion of a peg to immobilize the wedge in the slot. The system is distinguishable for the requirement of an apertured wedge and the inclined configuration of the slot.

U.S. Pat. No. 5,904,875 issued on May 18, 1999, to Dallas E. Myers describes a sloped wedge for use with concrete wall panel pins. The slotted pin is inserted between the flanges of two form panels having in addition, an apertured tie rod and two bushings. The wedge must have a curved configuration, a length of 3.25 inches, and a radius of curvature of 6.0625 inches. The combination device is distinguishable for the requirement of a curved wedge.

U.S. Pat. No. 4,846,615 issued on Jul. 11, 1989, to Richard C. E. Forsyth describes a pin and curved wedge fastener for connecting lattice panel bridges. The pin has three diametric slots of rectangular cross-section spaced along its length, the two endmost slots being aligned in a particular longitudinal plane while the third or intermediate slot is aligned in a second longitudinal plane perpendicular to the first one. The wedge must be curved in one or two planes. The pin and wedge fastener is distinguishable for its multi-slotted pin and curved wedge.

U.S. Pat. No. 2,941,437 issued on Jun. 21, 1960, to William C. Brander describes a threadless bolt having a hexagonal head and a wedge shaped retaining key. The key can have various shapes and has a thickness gradient increasing to its outermost end when inserted. The key shape can vary from a pointed entry end which is arrow-shaped, tooth-shaped and step-shaped. The rear end can be notched or straight. The top and bottom sides are not parallel. A washer can be used to permit a tight fit for the wedge in the slot of the pin. The combination is distinguishable for its requirement for a pointed wedge with non-linear sides and a thicker rear end.

U.S. Patent No. 1,546,082 issued on Jul. 14, 1925, to Karl F. W. Kempf describes a key bolt comprising a web in the bolt formed by punching from both sides and then forming the key slot in the thin web. The wedge has one bevelled edge. The key bolt is distinguishable for its slotted web.

U.S. Pat. No. 1,843,925 issued on Feb. 9, 1942, to Karl F. Kempf describes another key bolt having a head of the bolt bevelled circumferentially or just at opposite sides. The slot in the bolt is also beveled at its bottom to form a ridge. The bolt has a tapered end. The wedge must have a bottom edge cut at the same angle as the bevel in the slot. The key bolt and wedge are distinguishable for requiring a certain beveled edge in the slot and for the bottom edge of the wedge.

U.S. Pat. No. 2,589,781 issued on Mar. 18, 1952, to Robert B. Cottrell describes a pin retaining means. A pin has an hexagonal head and a cylindrical shank having a reduced portion at its end which supports an annular flange including a taper key or wedge and a lug. The pin retaining means is distinguishable for its required annular flange, taper key and lug.

U.S. Pat. No. 3,203,548 issued on Aug. 31, 1965, to Alexander J. Roubal describes a gib and cotter bolt assembly for holding down tensioning cloths in vibrating screens. The cotter bolt has a slot or cotter way in which the cotter wedge and gib fits. The assembly is distinguishable for requiring a gib with the cotter wedge.

U.S. Pat. No. 4,240,322 issued on Dec. 23, 1980, to Lothar Teske describes a wedge-pin fastener, wherein the plastic wedge is bent over to lock the joined parts. The device is distinguishable for requiring a plastic bendable wedge for locking the two parts together.

U.S. Pat. No. 4,508,479 issued on Apr. 2, 1985, to Georg Mez describes a device for fastening sheet metal together. The fastener has a head, a bifurcated stem and a gripping keeper placed in a fork of the stem with a pin. The keeper has a cutout shaped like a keyhole which is serrated on one side. The device is distinguishable for its different structure of the gripping keeper.

U.S. Pat. No. 4,975,009 issued on Dec. 4, 1990, to John T. Easton et al. describes a bolt and wedge assembly for temporarily connecting two panel units having perpendicular joining flanges. A bolt which can be cylindrical, flat or rectangular in cross-section has a conical nose, a transverse slot, a flange with a collar, two peripheral grooves, a box-shaped bolt support member, and a handle portion. A wedge is lodged in the transverse slot of the bolt for securement. The bolt and wedge assembly is distinguishable for the manifold features required for the bolt.

None of the above inventions and patents, taken either singularly or in combination, is seen to describe the instant invention as claimed. Thus, a steel setting device solving the aforementioned problems is desired.

SUMMARY OF THE INVENTION

The steel setting device is a bolt having an enlarged flat head portion, a cylindrical body portion with a slot extending through the body portion proximate the head, a threaded portion or an apertured portion, and a tapered portion. The device includes a flat wedge element having an isosceles trapezoidal shape. At least one, and preferably two, of the bolts are inserted through aligned apertures in the steel plates of I-beam girders to be joined to an I-beam column, the plates being placed back to back, the head portion of the bolt being on one side of the two plates and the slot being on the other side of the two plates. The wedge elements are inserted through the slots to temporarily secure the two steel plates together. Additional securement elements are added, such as a nut or a pin at a distal end of the bolt. Permanent bolts and nuts can then be installed through other pairs of aligned apertures in the plates. Once the permanent bolts are installed, the wedges can be tapped out of the slots and the cylindrical bolt elements of the steel setting device can be removed. Additional permanent bolts can be installed through the aligned apertures previously occupied by the temporary bolts of the steel setting device.

Accordingly, it is a principal object of the invention to provide a steel setting device for setting or aligning steel plates.

It is another object of the invention to provide a method of utilizing the steel setting device to join I-beam girders to an I-beam column.

It is a further object of the invention to provide an elongated bolt with a rectangular slot for receiving a wedge and either a threaded end for receiving a nut or an apertured end for receiving a pin.

Still another object of the invention is to provide a wedge with an isosceles trapezoidal shape.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
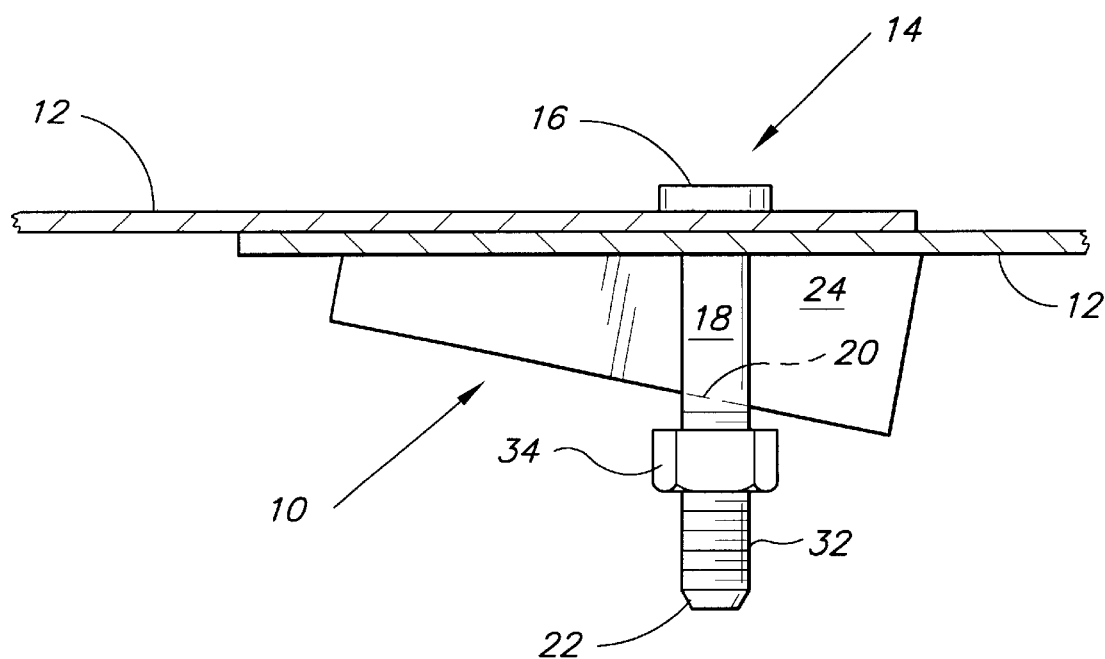
FIG. 1 is an environmental, elevational view of a steel element setting device clamping two steel plate portions with a wedge and a bolt with a nut for the threaded end according to a first embodiment of the present invention.
Figure 2:
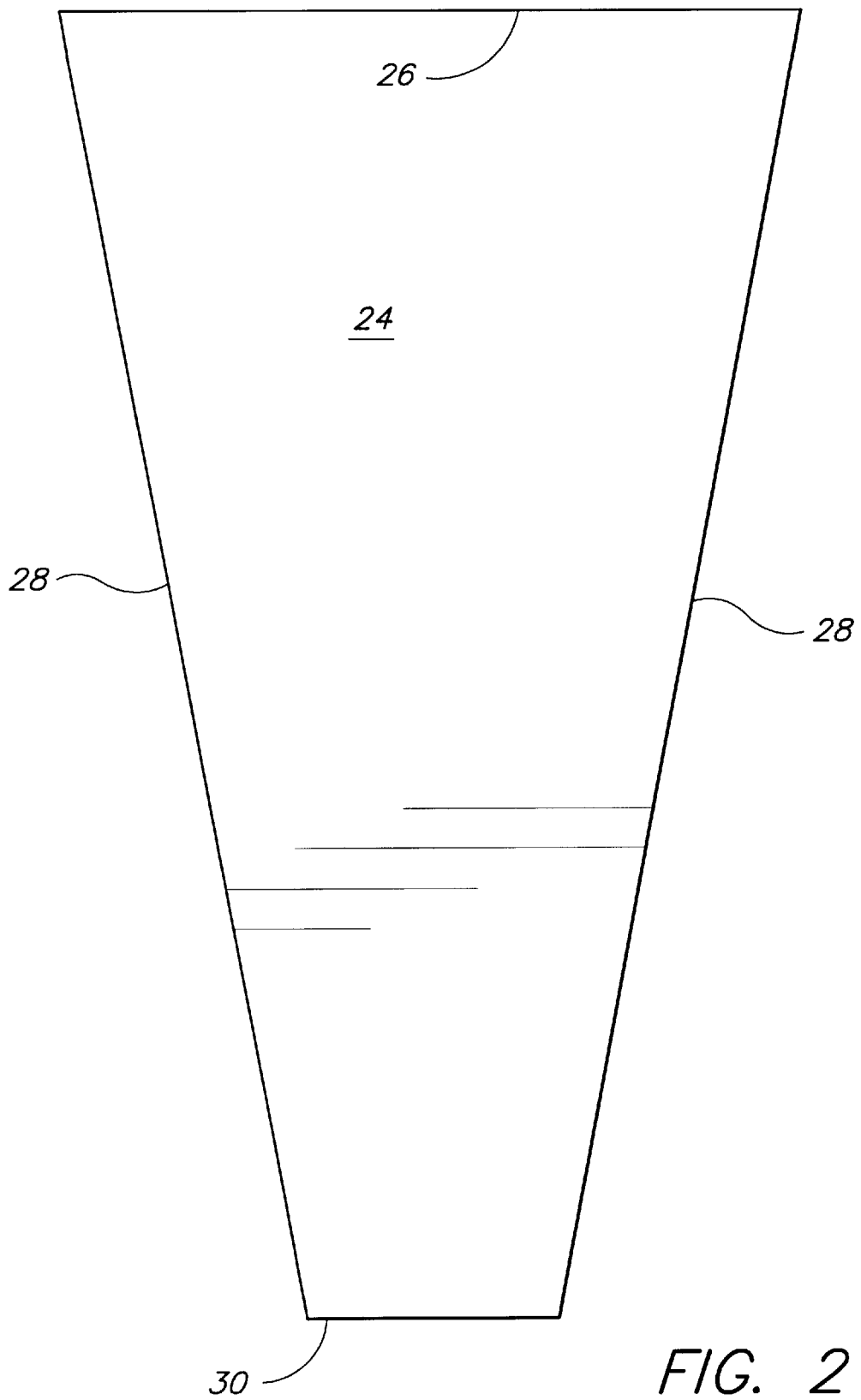
FIG. 2 is a side elevational view of the wedge element.
Figure 3:
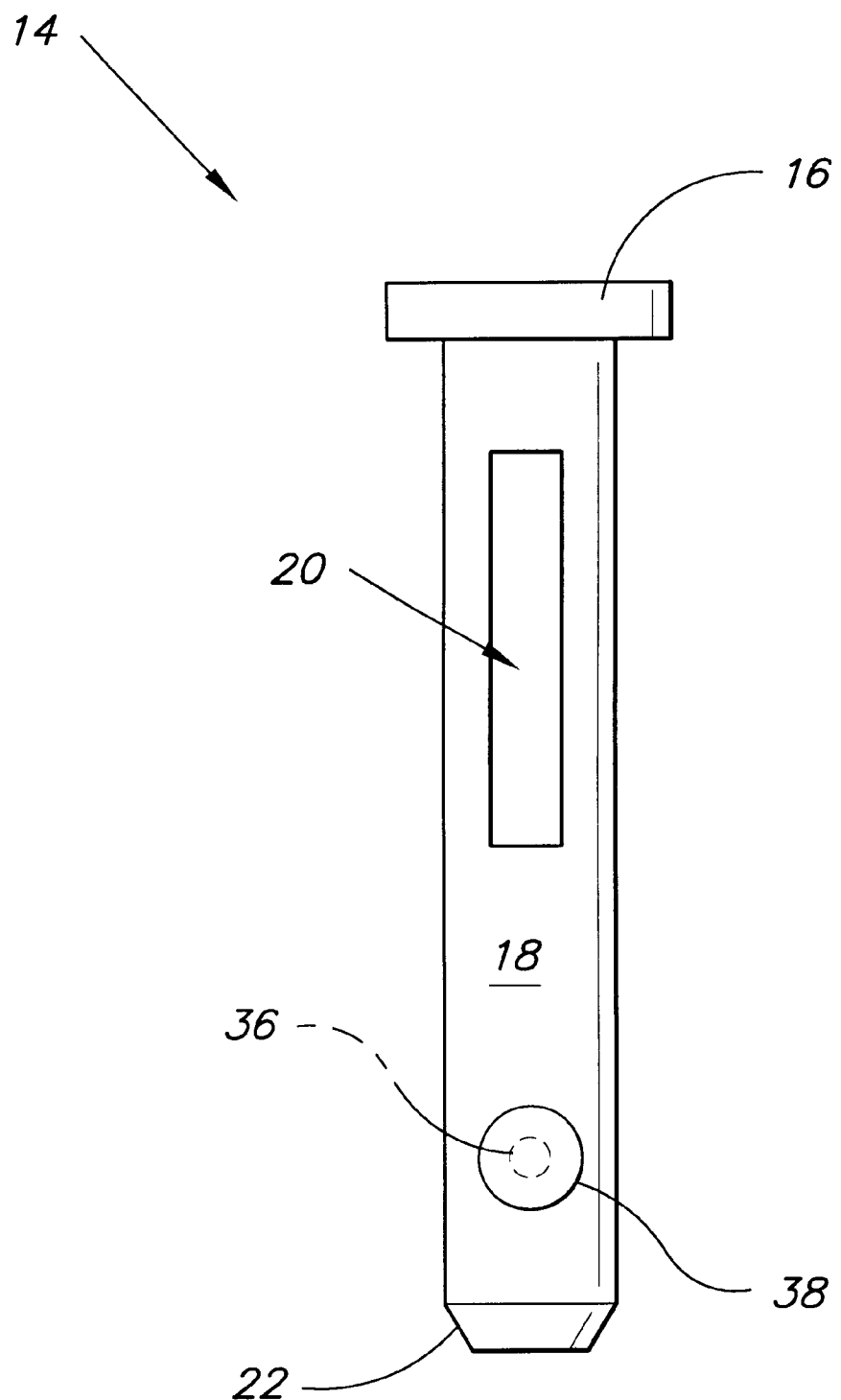
FIG. 3 is a side elevational view of the slotted bolt element with an aberrant a distal end for a pin as a second embodiment.
Figure 4:
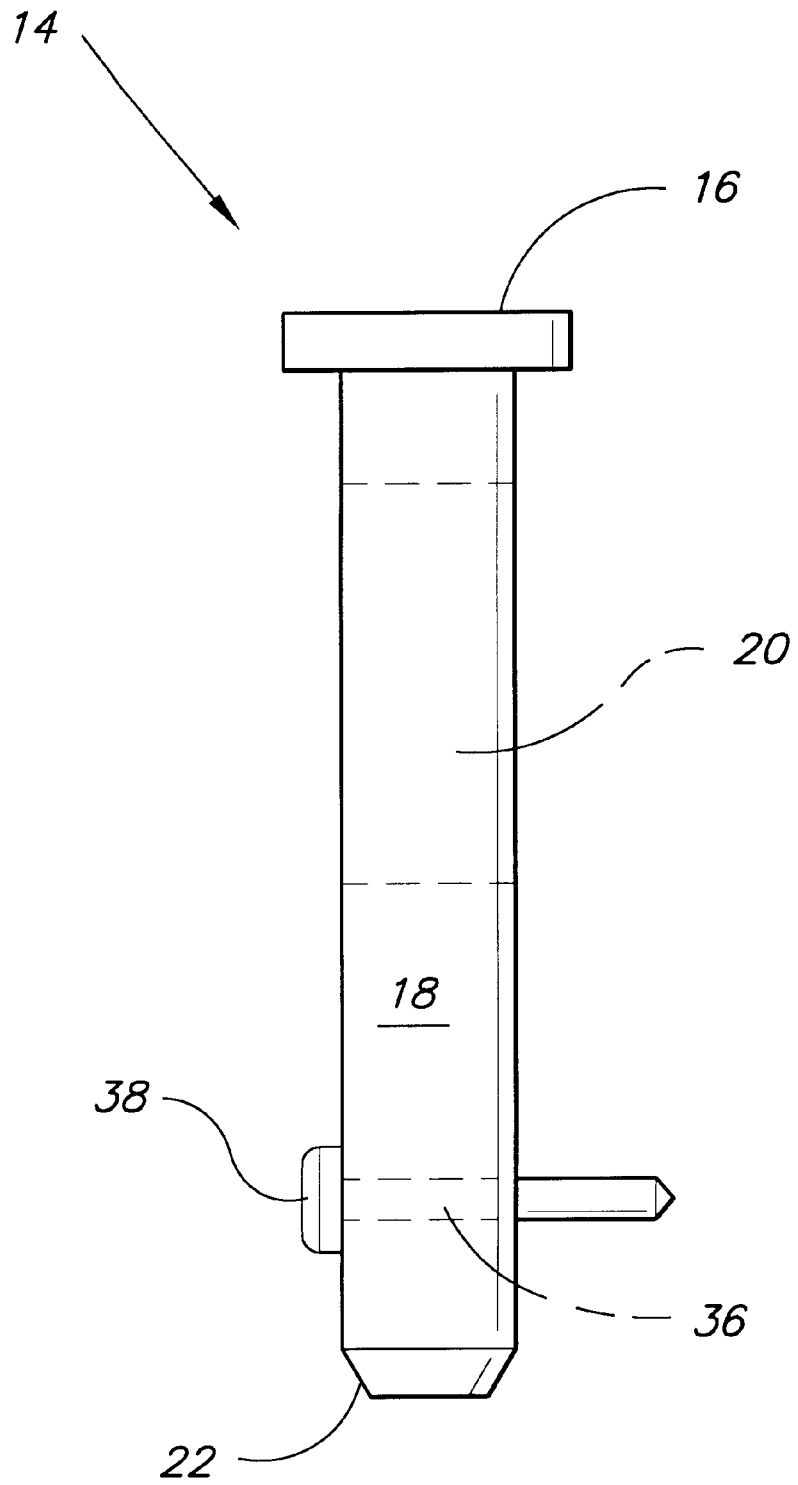
FIG. 4 is a side elevational view of the inventive bolt shown at a right a le to the FIG. 3 bolt and showing the slot in shadow.

As shown in FIGS. 1 and 2, a first embodiment of the present invention is directed to an alignment device 10 for temporarily aligning two steel plates 12 to permit the attachment of other bolts accurately. It should be noted that although only portions of the steel plates 12 are depicted in FIG. 1, the application of the present invention to attachment of steel girders to a steel column is particularly suitable.

In FIG. 1, a cylindrical bolt element 14 is depicted as having an enlarged flat head portion 16, a cylindrical body portion 18 with a slot 20 proximate the head portion 16, a threaded portion 32, a nut 34, and a tapered end portion 22. The slot 20 is rectangular in shape and aligned with a longitudinal axis of the bolt element 14. The slot 20 must be located at a distance from the head portion 16 to adequately secure the two apertured pieces 12 together. Therefore, an assortment of bolt elements 14 can be provided for various thicknesses of the metal pieces 12 being connected.

In FIGS. 1 and 2, a flat wedge element 24 is shown as having an isosceles trapezoidal shape with a top wide edge 26, two straight sides 28 of equal length, and a narrow edge 30 for insertion into the slot 20 of the bolt element 14 for temporary alignment and securement of two apertured pieces 12. The wedge 24 has a rectangular cross-section commensurate in size to snugly fit through the slot 20 of the bolt element 14.

One particularly suitable application of the inventive device 10 is illustrated in FIGS. 5 to 8 for utilizing the wedge 24 and bolt 14 in the joining of two horizontal I-beams 40 (left) and 42 (right) to a vertical I-beam column 44 at the same level. The horizontal I-beams 40, 42 have a T-shaped flange 46 at each end with four apertures 48 arranged as corners of a rectangle. The column 42 has corresponding apertures 48.

Figure 5:
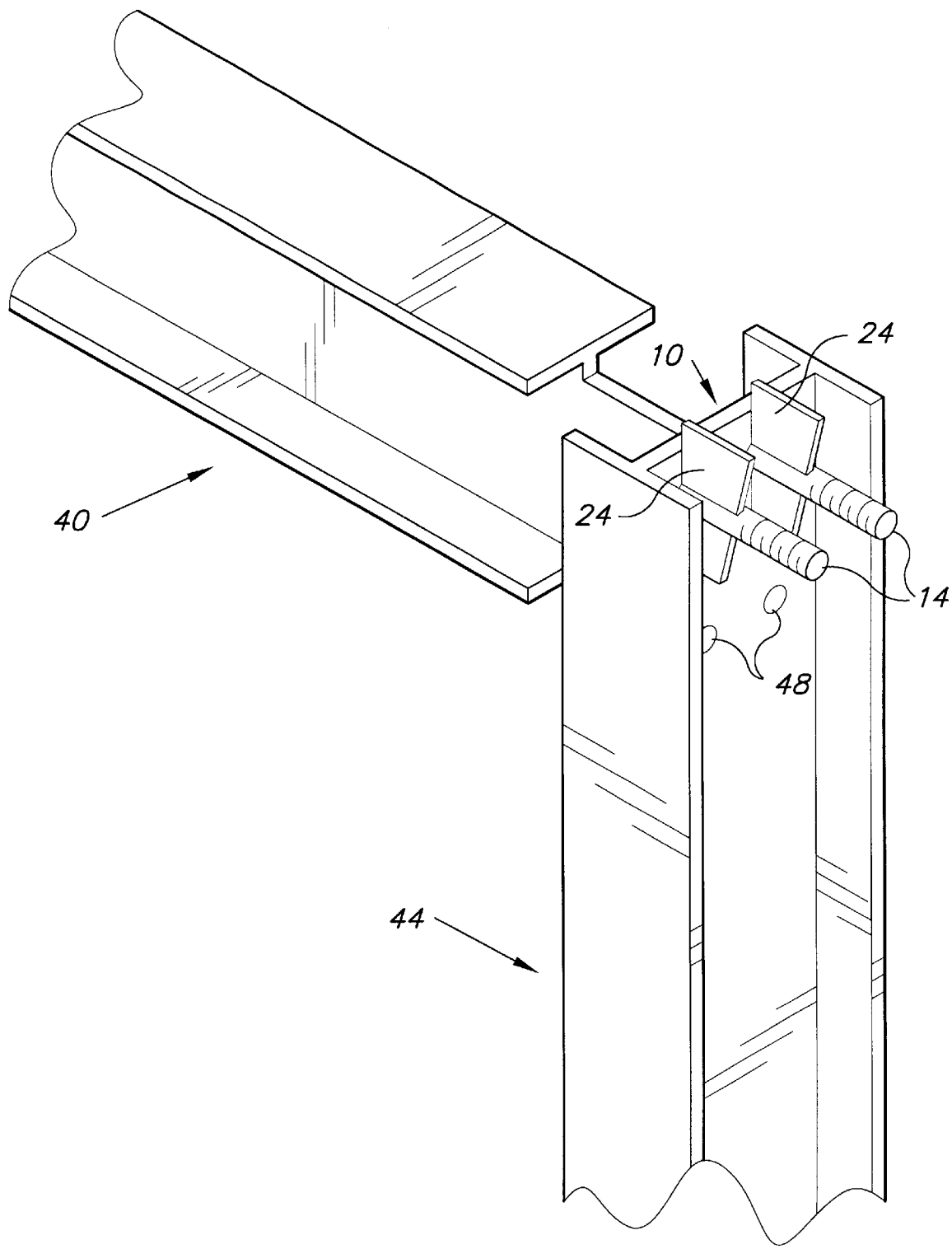
FIG. 5 depicts the first step in the process of utilizing the steel element setting device to form a double connection of two horizontal I-beams to a vertical I-beam column, wherein the wedges are in place on the bolts.
Figure 6:
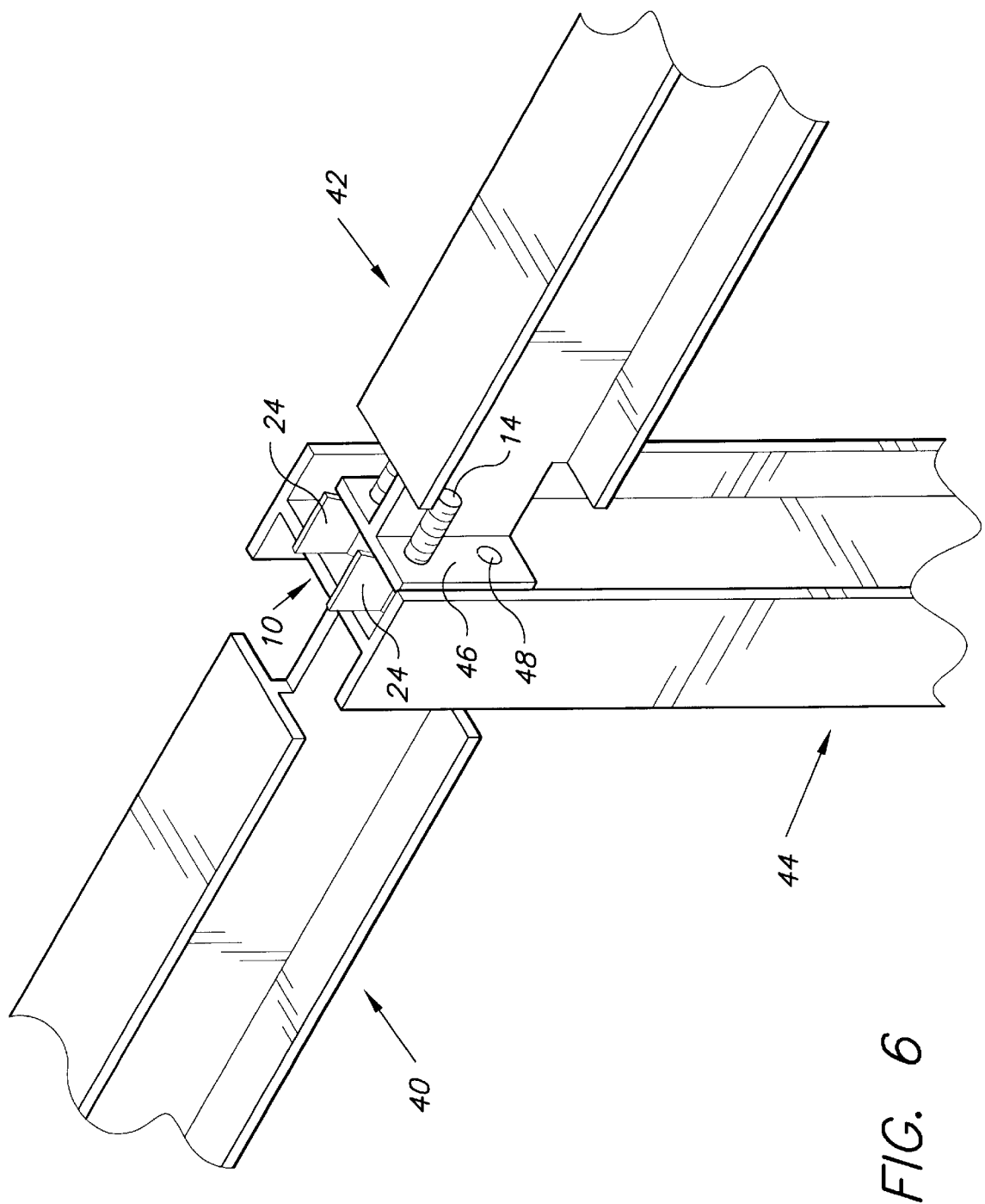
FIG. 6 illustrates the second step in aligning the second I-beam onto ends of the wedged bolts.
Figure 7:
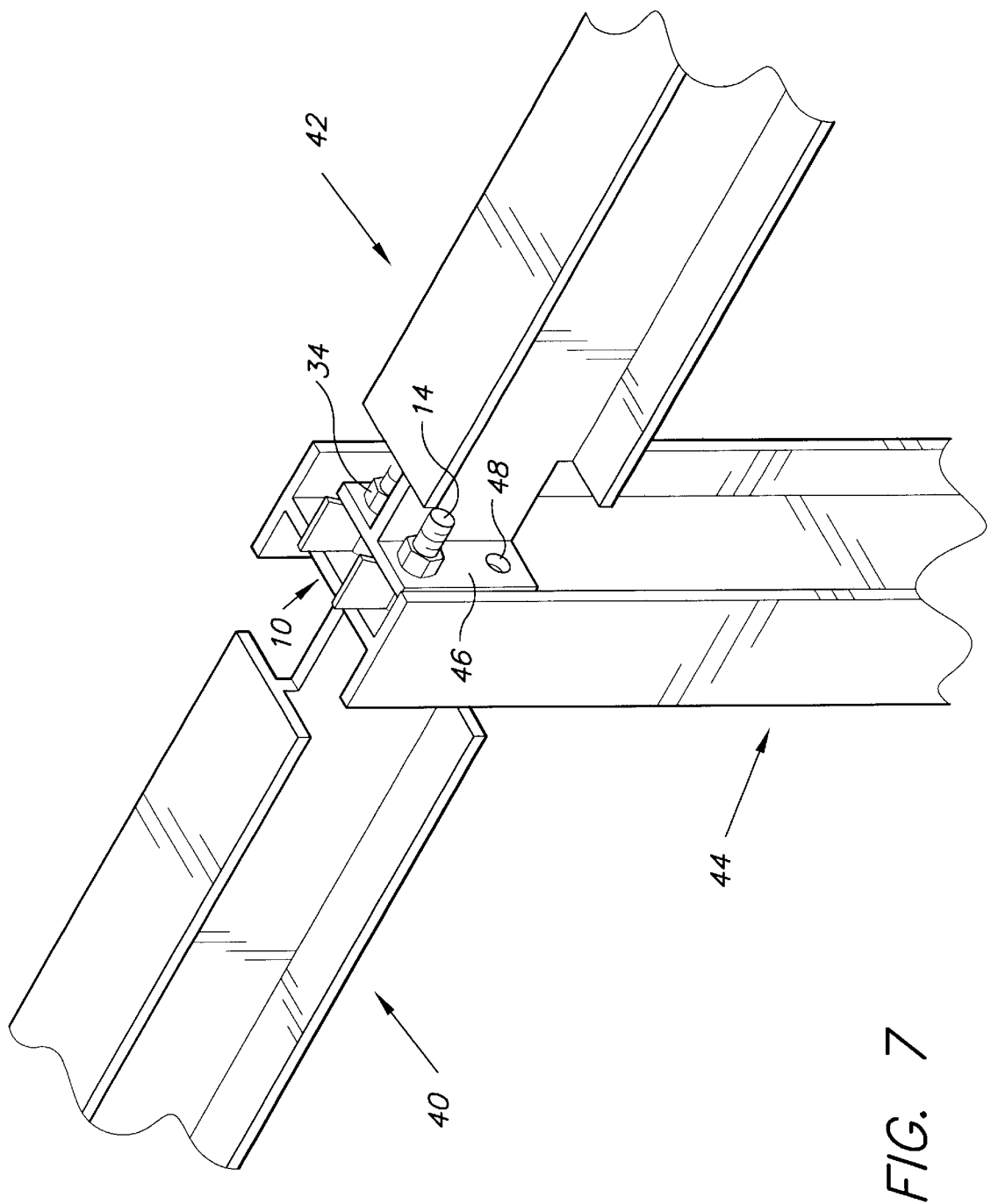
FIG. 7 shows the third step of placing nuts on the bolts, subsequent removal of the wedges, and tightening of the temporary nuts.
Figure 8:
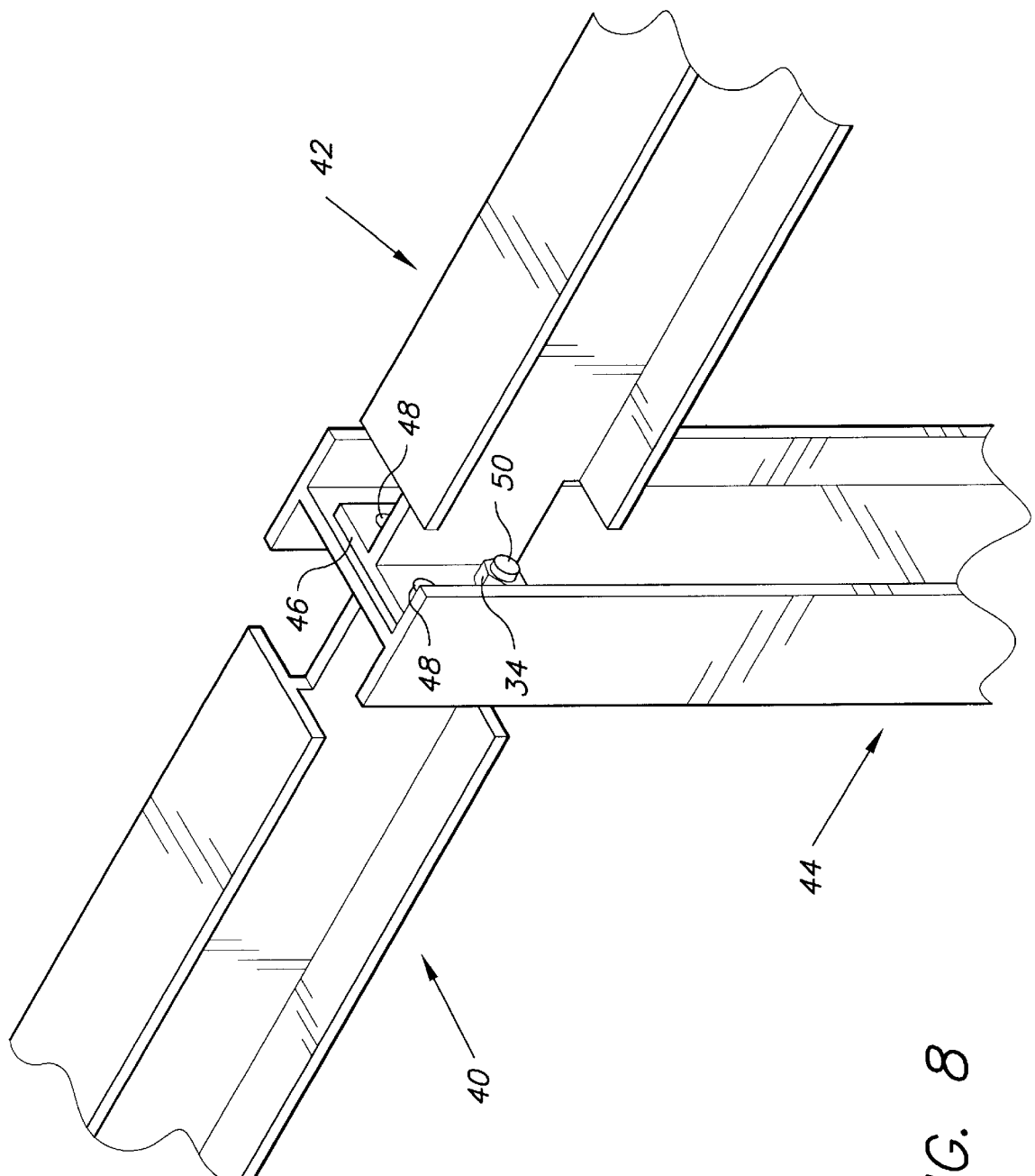
FIG 8 is the final step, wherein the permanent bolts and nuts are placed in the pair of lower apertures and the temporary bolts removed for subsequent addition of another pair of permanent bolts and nuts in the upper apertures.

In the first step shown by FIG. 5, the T-shaped flange 46 of the left I-beam 40 is temporarily joined to the column 44 by passing two bolts 14 through the upper apertures 48 and inserting the wedges 24. In the second step depicted in FIG. 6, the second or right I-beam 42 is aligned on the bolts 14. In the third step illustrated in FIG. 7, nuts 34 are placed on the bolts 14 and the wedges 24 are removed. The nuts 34 are tightened to cause the abutment of the flange 46 of the right I-beam 42 to the column 44. In the fourth and final step of FIG. 8, a pair of permanent bolts 50 are placed through the corresponding lower pair of apertures 48 in the right I-beam 42, the column 44 and the left I-beam 40. Nuts 34 are placed and tightened on the bolts 50 to secure the beams 40 and 42 to the column 44. Then the pair of temporary bolts 14 can be removed to result in the accurate joining of two girders to a column. Additional permanent bolts 50 can be installed through the aligned apertures 48 previously occupied by the temporary bolts 14.

Exemplary sizes of the device are as follows:

bolt 14: head, 1.5 in. diameter; body, 0.75 in. diameter, 4.5 in. Long; slot 20, 1.75 in. long, 5/16 in. wide and spaced 0.5 in. from the head.

wedge 24: 6 in. long, 3 in. wide at wide end tapered to 1 in. wide at opposite end; 5/16 in. thick.

It is to be understood that the present invention is not limited to the embodiment described above, but encompasses any and all embodiments within the scope of the following claims.

I claim:

1. A steel setting alignment device for temporarily aligning two steel pieces comprising:

a cylindrical bolt element having an enlarged flat head portion, a cylindrical body portion with a slot proximate the head, and a tapered end portion, and a threaded portion between the slot and the tapered end portion and a nut secured on said threaded portion; and a flat wedge element having an isosceles trapezoidal shape for insertion into the slot of the bolt element for temporary alignment and securement of two apertured pieces.

2. The alignment device according to claim 1, wherein the slot is aligned with a longitudinal axis of the bolt element.

3. The alignment device according to claim 1, wherein the slot is rectangular.

4. The alignment device according to claim 1, wherein the slot is located at a distance from the head portion to adequately secure the two apertured pieces together.

5. The alignment device according to claim 1, wherein the wedge has a rectangular cross-section.

6. A steel setting alignment device for temporarily aligning two steel pieces comprising:

- a cylindrical bolt element having an enlarged flat head portion, a cylindrical body portion with a slot proximate the head, and a tapered end portion, and a pin inserted in an aperture positioned between the slot and the tapered end portion; and
- a flat wedge element having an isosceles trapezoidal shape for insertion into the slot of the bolt element for temporary alignment and securement of two apertured pieces.

7. The alignment device according to claim 6, wherein the slot is aligned with a longitudinal axis of the bolt element.

8. The alignment device according to claim 6, wherein the slot is rectangular.

9. The alignment device according to claim 6, wherein the slot is located at a distance from the head portion to adequately secure the two apertured pieces together.

10. The alignment device according to claim 6, wherein the wedge has a rectangular cross-section.

* * * * *